US010798437B2

(12) United States Patent
Yegorov

(10) Patent No.: US 10,798,437 B2
(45) Date of Patent: Oct. 6, 2020

(54) SYSTEMS AND METHODS FOR PREDICTIVE MEDIA FILE TRANSFER TO USER-CARRIED STORAGE COMPONENTS

(71) Applicant: SLING MEDIA LLC, Foster City, CA (US)

(72) Inventor: Oleksandr Yegorov, Foster City, CA (US)

(73) Assignee: SLING MEDIA LLC, Foster City, CA (US)

( * ) Notice: Subject to any disclaimer, the term of this patent is extended or adjusted under 35 U.S.C. 154(b) by 103 days.

(21) Appl. No.: 16/021,920

(22) Filed: Jun. 28, 2018

(65) Prior Publication Data

US 2019/0208249 A1 Jul. 4, 2019

Related U.S. Application Data

(60) Provisional application No. 62/611,810, filed on Dec. 29, 2017.

(51) Int. Cl.
*H04N 21/262* (2011.01)
*H04N 21/258* (2011.01)
*H04N 21/45* (2011.01)

(52) U.S. Cl.
CPC . *H04N 21/26241* (2013.01); *H04N 21/25841* (2013.01); *H04N 21/25866* (2013.01); *H04N 21/4524* (2013.01); *H04N 21/4532* (2013.01)

(58) Field of Classification Search
CPC ........... H04N 21/251; H04N 21/25833; H04N 21/25841; H04N 21/25866; H04N 21/26216; H04N 21/26233; H04N 21/2665; H04N 21/41407; H04N 21/42202; H04N 21/44213; H04N 21/6582; H04N 21/84; H04N 21/26241; H04N 21/4524; H04N 21/4532; H04N 21/6543; H04N 21/41422; H04N 21/4334
See application file for complete search history.

(56) References Cited

U.S. PATENT DOCUMENTS 7,010,762 B2 * 3/2006 O'Neil ................ G06F 12/0862
715/853
8,239,957 B2 * 8/2012 Belenky ................ G06F 21/10
380/201

(Continued)

*Primary Examiner* — Mulugeta Mengesha
*Assistant Examiner* — Alazar Tilahun
(74) *Attorney, Agent, or Firm* — Lorenz & Kopf LLP

(57) ABSTRACT

Devices, systems, and methods are provided for automatically scheduling and carrying-out the transfer of media content to user-carried storage components in anticipation of predicted user needs. In various embodiments, the method includes the step or function of determining when an offline viewing event is forecast to occur due to an anticipated desire on behalf of the end user to view media content in a future timeframe without reliance on a network connection. When determining that an offline viewing event is forecast to occur, media transfer start conditions are established for initiating transfer of selected media content to a user-carried memory component prior to the forecast occurrence of the offline viewing event. When the media transfer start conditions are subsequently satisfied, transfer of the selected media content is initiated from a media content server, over a network, and to the user-carried memory component.

20 Claims, 2 Drawing Sheets

(56) References Cited

U.S. PATENT DOCUMENTS

Figure 1:
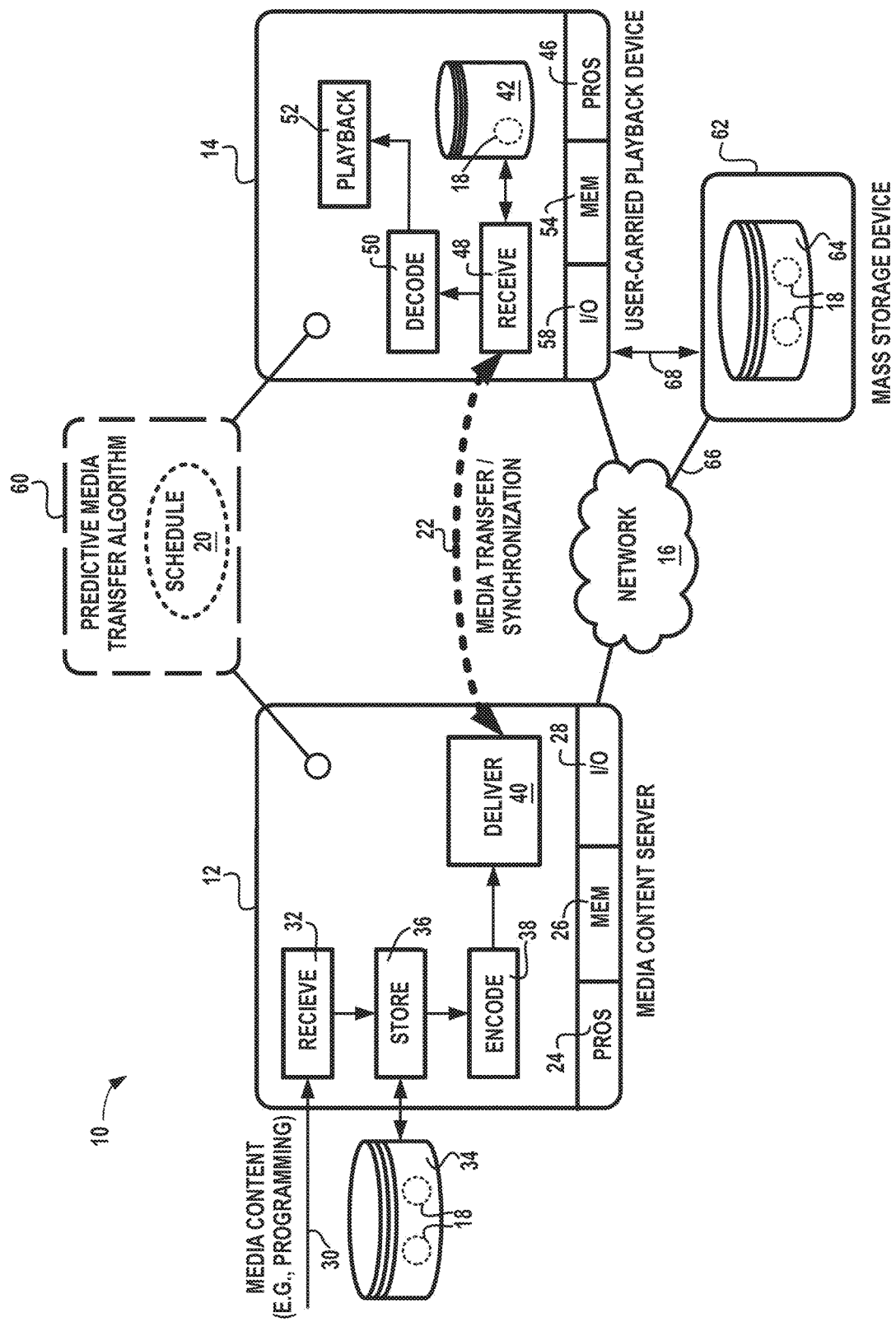

| | | | |
|---|---|---|---|
| 2008/0022304 A1* | 1/2008 | Prus | G11B 27/034 725/39 |
| 2013/0173796 A1* | 7/2013 | Grab | H04N 21/251 709/225 |
| 2018/0213283 A1* | 7/2018 | Warrick | H04N 7/106 |

* cited by examiner

SYSTEMS AND METHODS FOR PREDICTIVE MEDIA FILE TRANSFER TO USER-CARRIED STORAGE COMPONENTS

CROSS-REFERENCE TO RELATED APPLICATIONS

This application claims priority to U.S. Provisional Patent Application Ser. No. 62/611,810, filed Dec. 29, 2017, the contents of which are hereby incorporated by reference.

TECHNICAL FIELD

The following generally relates to digital media distribution and playback, and, more particularly, to systems, devices, and methods for automatically scheduling and conducting media file transfer to user-carried storage components in anticipation of predicted user needs.

ABBREVIATIONS

Abbreviations appearing less frequently in this document are defined upon initial usage, while abbreviations appearing with greater frequency are defined below.
DVR—Digital Video Recorder;
OTT—Over-The-Top;
STB—Set-Top Box; and
VOD—Video on Demand.

BACKGROUND

End users now commonly consume (view and listen to) media content by streaming selected content to user-carried playback devices, such as smartphones, laptops, tablets, and wearable devices. While enhancing the ease and convenience with which media content is consumed, the streaming delivery of media content remains limited in certain respects. The ability to stream media content is, by its nature, dependent upon the availability of a live or active network connection to a media content streaming source, such as a VOD platform or OTT television service, throughout the entirety or substantial entirety of each playback session. This can be problematic when a network connection is unavailable or is not desirably utilized due to, for example, lack of reliability, poor security, or the requisite payment of usage fees. One well-known instance in which end users commonly desire to view media content without reliance on a network connection occurs during commercial airline flight. Often, network connections suitable for streaming media content are not provided on commercial airline flights; or, if provided, such network connections are hampered by limitations, such as bandwidth constraints and usage fees.

When desiring to consume media content without reliance on a network connection, an end user can simply engage in offline playback of the desired content, if stored in a local memory accessible to the user's playback device. However, in many instances, an end user may neglect to transfer (copy or move) desired media content to local memory in advance of the offline viewing event; that is, the timeframe during which media content is desirably viewed without reliance on a network connection. For example, when departing for a commercial airline flight, end users are often distracted by their preparations for the upcoming flight and, thus, may forget to initiate transfer of all desired media content to local memory adequately in advance of departing for the airport. Even when remembering to transfer media content to local memory in advance of an upcoming airline flight or other offline viewing event, end users may find the media content transfer process cumbersome; e.g. due to the need to select desired media content from a relatively vast library of available content and/or due to complexities introduced by single copy licenses, which prohibit multiple copies of a single media item from being concurrently available for viewing on different consumer devices.

BRIEF SUMMARY

Methods for automating media content transfer to user-carried memory components, as conducted in anticipation of predicted user needs, are provided. In various embodiments, the method includes determining when an offline viewing event is forecast to occur due to an anticipated end user desire to view media content in a future timeframe without reliance on a network connection; e.g., as may be the case when the end user is scheduled for upcoming travel on a commercial airline flight. When determining that an offline viewing event is forecast to occur, media transfer start conditions are established for initiating transfer of selected media content to a user-carried memory component at some juncture prior to the forecast offline viewing event. When the media transfer start conditions are satisfied, transfer of the selected media content is initiated from a media content server, over a network, and to the user-carried memory component. The user-carried memory component can be, for example, a flash drive, a memory card, or other discrete mass storage device of the type commonly carried on a user's person. Alternatively, the user-carried memory component can be contained in (and may or may not be readily removable from) a user-carried playback device, such as a smartphone, laptop, tablet, or wearable device.

User-carried playback devices, which perform functions for automating media content transfer to user-carried memory components in anticipation of predicted user needs, are further provided. In certain implementations, the user-carried playback device includes a memory component and a processor coupled to the memory component. The user-carried playback device further includes computer-readable code that, when executed by the processor, causes the user-carried playback device to perform the operations of: (i) determining when an offline viewing event is forecast to occur due to an anticipated end user desire to view media content in a future timeframe without reliance on a network connection; (ii) when determining that an offline viewing event is forecast to occur, establishing media transfer start conditions for initiating transfer of selected media content to the memory component contained in the user-carried playback device prior to the forecast offline viewing event; and (iii) when the media transfer start conditions are satisfied, initiating transfer of the selected media content from the media content server, over a network, and to the user-carried memory component.

Media content servers, which carry-out functions similar to those set-forth in the preceding paragraph, are still further provided. Embodiments of the media content server may assume the form of a consumer media device, such as an STB or DVR, located in a residence of an end user. Alternatively, embodiments of the media content server may assume the form of a commercial server, which provides streaming (e.g., VOD or OTT television) content over the Internet. In embodiments, the media content server includes a processor and a computer-readable storage medium, which stores a computer-readable code or instructions. When executed by the processor, the computer-readable code causes the media content server to: (i) determine when an offline viewing event is forecast to occur due to an anticipated desire on behalf of the end user to view media content in a future timeframe without reliance on a network connection; (ii) when determining that an offline viewing event is forecast to occur, establish media transfer start conditions for initiating transfer of selected media content to a memory component contained in the user-carried playback device prior to the forecast offline viewing event; and (iii) when the media transfer start conditions are satisfied, initiate transfer of the selected media content from the media content server, over a network, and to the user-carried memory component.

The foregoing methods and variants thereof can be implemented through software or program products bearing computer-readable instructions. Various additional examples, aspects, and other features of embodiments of the present disclosure are described in more detail below.

BRIEF DESCRIPTION OF THE DRAWING FIGURES

Figure 2:
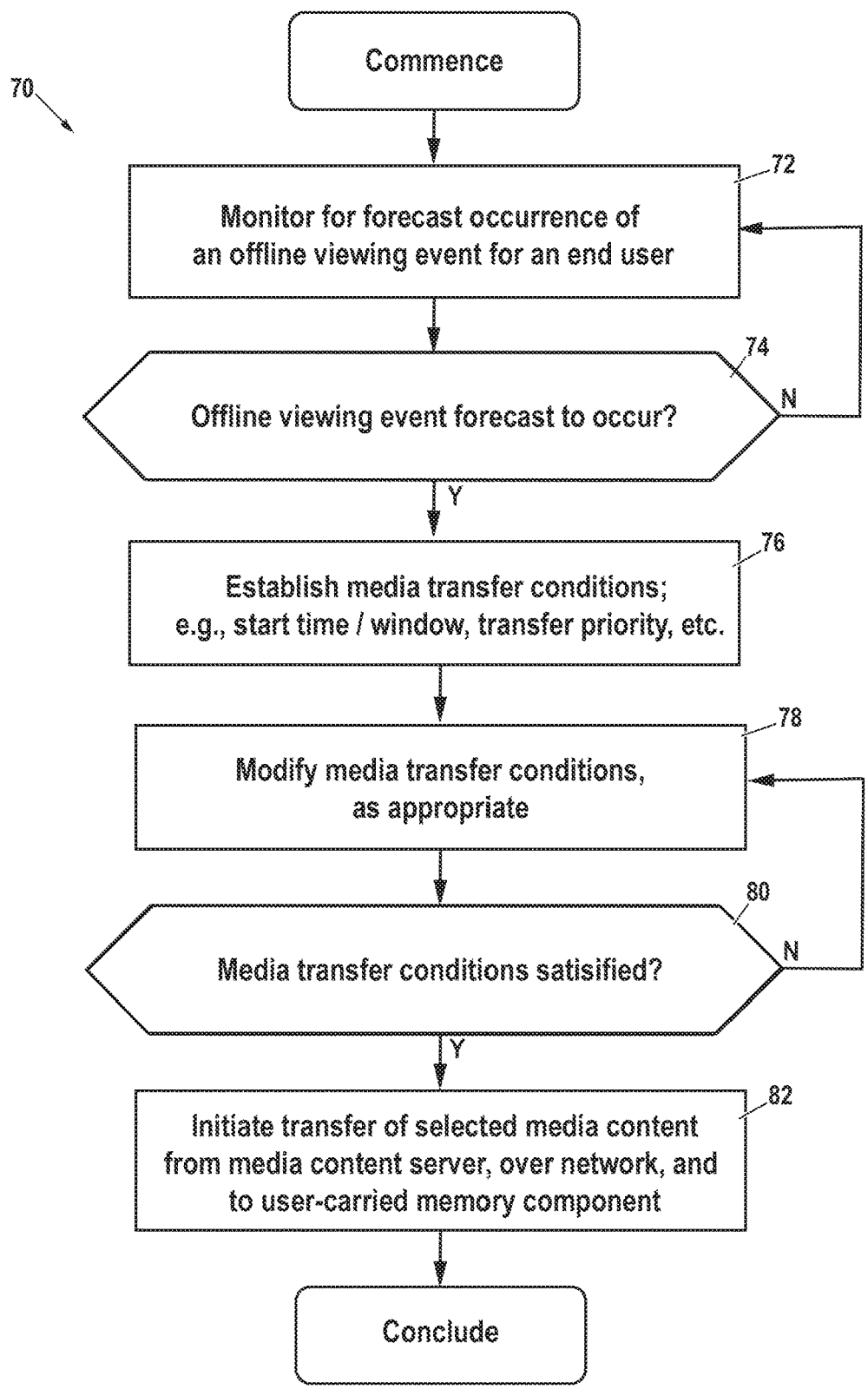

Exemplary embodiments will hereinafter be described in conjunction with the following drawing figures, wherein like numerals denote like elements, and:

FIG. 1 is a schematic illustrating a multidevice system including a user-carried memory to which media content files may be transferred from a media content server in anticipation of predicted user needs, as illustrated in accordance with an exemplary embodiment of the present disclosure; and FIG. 2 is a flowchart of a process for automatically scheduling and initiating the transfer of selected media content files to the user-carried memory component shown in FIG. 1, as illustrated in accordance with an exemplary embodiment of the present disclosure.

DETAILED DESCRIPTION

The following detailed description of the invention is intended to provide various examples, but it is not intended to limit the invention or the application and uses of the invention. The term "exemplary," as appearing throughout this document, is synonymous with the term "example" and is utilized repeatedly below to emphasize that the following description provides only multiple non-limiting examples of the invention and should not be construed to restrict the scope of the invention, as set-out in the Claims, in any respect.

Devices, systems, and methods are provided for automating media content transfer to user-carried memory components in anticipation of predicted user needs. The below-described devices, systems, and methods automatically initiate and carry-out the transfer of selected media content items when determining that an offline viewing event is forecast to occur. As noted above, the term "offline viewing event" refers to an event during which there exists a user desire (actual or anticipated) to consume media content without reliance on a network connection. When determining that an offline viewing event is forecast to occur, media transfer start conditions are established for initiating transfer of selected media content to the user-carried memory component prior to the offline viewing event. Such media transfer start conditions may specify, for example, a start time at which the transfer of media files should commence, absent modification or cancellation by the end user. Alternatively, the media transfer start conditions may specify a time range or "start time window" in which media transfer should commence depending upon, for example, home network availability or other factors. When the media transfer start conditions are satisfied, transfer of the selected media content is initiated automatically (that is, without requiring additional user input) from the media content server, over the network, and to the user-carried memory component.

During the media transfer process, selected media content is transferred to the user-carried memory component from at least one media content server. The media content selected for transfer can be determined based upon user input, a user profile (e.g., as established by tracking user viewing behaviors), timeliness, or utilizing various other criteria. In certain implementations, selected media content may be transferred from a media content server assuming the form of a network-connected streaming server; that is, a server (or group of servers) providing streaming media content, such as VOD or OTT television programming, over a network to client devices. In other instances, the media content server may assume the form of a consumer media device, such as an STB or DVR, which supplies stored media content to the user-carried memory component during the media file transfer process. In this latter regard, when the user-carried memory component is contained within a user-carried playback device, such a smartphone, tablet, laptop, or wearable device, the playback device may synchronize with the consumer media device during the media file transfer process. Transfer of the media content files to the user-carried memory component can encompass any process, including copying and moving (cut-and-paste) operations, which result in the storage of the selected media files in the computer-readable medium of the memory component.

In embodiments, a media content server, the user-carried playback device, or a combination thereof may execute computer-readable instructions contained in a computer program or algorithm. When executed, the algorithm may cause the executing device (e.g., media content server and/or the user-carried playback device) to extract information pertaining to user travel plans from data stored on the user-carried playback device, data stored in remotely-located servers (colloquially, the "cloud"), or data otherwise accessible via a network connection, such as an Internet access point. For example, in certain embodiments, the algorithm may extract commercial flight information (e.g., a digital itinerary) from a user calendar stored in memory on the playback device, stored as online calendar accessible via a network connection, or otherwise accessible to the executing device. This information may then be utilized to determine when an end user is scheduled to depart on travel, as indicated by a flight departure time. The executing device may then schedule the media file transfer start conditions, such as the start time of the file transfer process, accordingly.

The media transfer start condition can also be adjusted, as appropriate, in view of estimated travel time to an airport (e.g., as may vary based upon traffic conditions), in response to detected changes (e.g., delays) in the scheduled flight departure time, and/or in response to changes in other dynamic factors. In other embodiments, future user travel other than upcoming commercial airline can be monitored for and utilized to predict impending offline viewing events. This latter approach may be appropriate if the user plans to travel to a geographical area lacking a suitable network connection, such as a foreign country or a relatively non-populated geographical area for camping. Additional description of exemplary algorithms suitable for performing such functions is provided below in conjunction with FIG. 2. First, however, a general system suitable for carrying-out embodiments of the predictive media file transfer process is described in conjunction with FIG. 1.

FIG. 1 is a schematic of a multidevice system 10 suitable for transferring media content files to one or more user-carried memory components in anticipation of predicted user needs or impending offline viewing events, as illustrated in accordance with an exemplary embodiment of the present disclosure. Multidevice system 10 includes media content server 12, which communicates with at least one user-carried playback device 14 over a communications network 16. Depending upon user input received at user-carried playback device 14 and the corresponding requests issued by playback device 14 to media content server 12 over network 16, media content server 12 may transmit media content, such as VOD or television programs, in a format for streaming delivery to playback device 14. The media content may be stored in a pre-encoded format at media content server 12 or, instead, may be encoded by server 12 on-the-fly as the media content is received from another source. User-carried playback device 14 may then store and playback the received media content, as commanded by an end user operating device 14. Further, media content 18 stored on media content server 12 may be delivered to playback device 14 in accordance with an established schedule 20 in certain instances, as described more fully below.

Media content server 12 contains appropriate hardware and computer-readable instructions, as embodied in software or firmware, to perform the processes described herein. Again, this may include receiving, storing, and/or encoding media content 18 in a desired format and, when appropriate, packetizing the media content for streaming transmitting to playback device 14 over network 16. Thus, embodiments, media content server 12 can be any electronic component or device capable of receiving video programs from broadcast media content, streaming content, stored media, or another content source. In certain implementations, media content server 12 may be implemented as consumer STB or similar television receiver, media player, DVR, or personal video recorder. In this case, media content server 12 may be associated with a particular end user and may be located within the user's residence. Equivalent embodiments may be implemented utilizing a conventional network server system, such as a hardware-implemented or cloud-based server operating on the Internet or other network.

Media content server 12 can operate utilizing any sort of conventional computing hardware. Generally, such hardware may include at least one processor 24, a computer-readable medium or memory 26, and any number of Input/Output (I/O) interfaces 28. With respect to I/O interfaces 28, in particular, interfaces 28 may include conventional network interface hardware enabling communications through network 16. In certain implementations, media content server 12 may include dedicated hardware, such as specialized integrated circuits, for receiving video programs, storing video programs, encoding video programs, delivering video programs, and the like. Still other embodiments may implement the various functions performed by media content server 12 utilizing software residing in memory 26 and executed by processor 24. Cloud-hosting or other virtualization techniques can also be utilized to perform the functionalities of media content server 12 in alternative implementations.

In embodiments, media content 18 may be initially received from any broadcast, point-to-point, stored media, or other source 30. Examples of programming sources include Digital Broadcast Satellite (DBS) programming; cable television programming; terrestrial broadcast programming; streaming media obtained via the Internet or another network 16; programming downloaded from a media sharing service; programming received from a standard Digital Video Disk (DVD), BLUE-RAY disk, or other stored media; and/or any other sources 30. Media content 18 are initially received at a suitable receiver module 32, which may be implemented as a television receiver/decoder or the like depending upon the type of media received. Received and decoded media content 18 is stored on an appropriate storage medium 34. In various embodiments, storage medium 34 is a disk drive or solid state memory associated with a DVR function of media content server 12, although various embodiments may use other storage medium. Storage module 36, then, may be implemented utilizing any conventional disk controller hardware or equivalent software executing on processor 24 or the like. Media content 18 is stored in storage medium 34 at least until synchronization with playback device 14, as discussed below.

Prior to delivery via network 16, media content server 12 encodes the received media content items 18 to one or more digital formats. Such encoding may occur either prior to or after storage on medium 34. In this regard, media content server 12 may convert a given program included in media content 18 prior to storage or concurrently with storage in embodiments. Other implementations may store the received program in compressed or other format and then perform the multi-layer encoding immediately prior to synchronization 22, or at any other appropriate time. Encoding may be performed utilizing an encoding module 38 implemented utilizing dedicated processing circuitry or equivalently in software executing on processor 24. Media file transfer during the below-described transfer or synchronization process may be accomplished, in part, utilizing a delivery module 40 further contained in media content server 12. In operation, playback device 14 suitably receives media content 18 from media content server 12 during ensuing media file transfer session 22. Received media content 18 may be stored in computer-readable storage medium 42 (herein, "memory 42") or another computer-readable storage area until playback on an integrated or external display, audio speakers, or the like. Playback may occur subject to the control of a media player application or other playback module 52 executed on user-carried playback device 14.

As indicated above, media content 18 may be initially received and stored at media content server 12 in any manner. In the schematic of FIG. 1, for example, broadcast media content or programming 18 is received via a DBS, cable, or other source 30 of television programming. Media content 18 may be equivalently received via network 16, via stored media (e.g., DVD or other discrete storage medium), or from any other source. Media content 18 may be initially stored in a DVR or another device containing computer-readable storage medium 34. Media content 18 may be encoded into an appropriate format prior to storage or, instead, content 18 may be encoded by server 12 just prior to transmission over network 16. Media content 18 stored at media content server 12 can include OTT television programming, VOD programming, and other video programming.

In various embodiments, and as generically indicated in FIG. 1, media file transfer or synchronization 22 is initiated in accordance with an algorithm 60 executed on one or both of media content server 12 and user-carried playback device 14. For example, in one implementation, a media player or media manager application executing on playback device 14 suitably contacts server 12 when playback device 14 is ready to receive synchronized media content 18. Server 12 and playback device 14 then establish a session (e.g., a transmission control protocol session or the like) allowing selected media content items, such as video programming, to be transferred (copied or moved) from server 12 to playback device 14 via network 16. In at least some embodiments, synchronized media content 18 may be transferred in the user's preferred order set forth in schedule 20. The media content items are conveniently transferred utilizing Trivial File Transfer Protocol (TFTP) or similar file transfer techniques, although other embodiments may use any type of network protocols and applications.

Providing sufficient resources are available, additional programs may be transferred for one or more media content 18 in the previously-described manner. The determination as to whether adequate resources remain available may be rendered by playback device 14, by media content server 12, or by a combination thereof. In various embodiments, playback device 14 may report transit times, lost packet rates, remaining storage amounts, and other data back to server 12 indicating whether such additional resources remain available. In other embodiments, server 12 may determine resource availability based upon the status of the media file transfer session 22 (e.g., whether a Transmission Control Protocol (TCP) session remains active), based upon transmit buffer utilization in server 12, and/or based upon any other factors, as appropriate. Received media content items 18 may be stored in memory 42 contained in playback device 14 and/or in memory 64 of storage device 62 for subsequent offline playback, as described below.

In the illustrated embodiment of FIG. 1, user-carried playback device 14 contains at least one processor 46, which carries-out the various process tasks described herein via execution of computer-readable code or instructions. Such instructions may be stored in a memory or in other non-transitory storage medium 54 available to payback device 14, including a receiving module 48, a decoding module 50, and playback module 52. The particular logic and hardware through which the various functions described herein are implemented will vary between embodiments. Generally, the particular means utilized to implement each of the various functions discussed could be any sort of hardware processing structures capable of executing conventional software logic in any format. Such processing hardware may include processor 24 or other components of media content server 12, as well as any other processors or other components associated with playback devices 14 as appropriate. Finally, user-carried playback device 14 also includes I/O interface features 58, which include an interface for communication over network 16 and an interface for detecting user input.

In the above-described example, the media file transfer process (as carried-out in accordance with schedule 20 established via predictive media file transfer algorithm 60) is principally described as transferring desired media programming or other media content into memory 42 contained in user-carried playback device 14. Thus, in keeping with the previously-introduced terminology, memory 42 may be considered a "user-carried memory component" in the context of this document. Memory 42 may be any non-volatile memory component and conveniently assumes the form of solid state memory (e.g., flash memory), which may or may not be removable from playback device 14. Notably, and as further indicated in FIG. 1, the media file transfer process can also be carried-out to transfer media to an external mass storage device 62 containing a computer-readable storage medium or memory 64, whether in addition to or in lieu of transfer of such content to memory 42. In this case, the pertinent media content may be transferred to mass storage device 62 from media content server 12 via a network connection 66.

In alternative embodiments, the desired media content may be transferred to mass storage device 62 from user-carried playback device 14 either over network 16 or via a direct connection 68, which may be realized as a physical (e.g., Universal Serial Bus (USB) port) connection or a wireless (e.g., BLUETOOTH) connections. In such embodiments, external mass storage device 62 may further be identified as a "user-carried memory component." The usage of such an external mass storage device 62 (e.g., a flash drive or memory card) may enhance user convenience by freeing usage of user-carried playback device 14 (e.g., a smartphone), while enabling a user to simply take mass storage device when needed (e.g., immediately prior to departure on a trip). Stated informally, such an approach may allow a user to quickly grab a flash drive, memory card, or similar mass storage item when leaving the user's residence prior to leaving for an outgoing airline flight or otherwise departing on travels. When a user subsequently desires to playback content stored on mass storage device 62, a user may do so by connecting or pairing playback device 14 with storage device 62 over a wired (e.g., USB port) or wireless connection.

Advancing now to FIG. 2, there is shown a flowchart of a computer-executed program or algorithm 70 for enabling the automatic transfer of media content to user-carried playback device 14. As discussed more fully below, algorithm 70 may be performed to automatically schedule the transfer of media content to a user-carried memory component (e.g., memory 54 of playback device 14 and/or memory 64 of storage device 62) in anticipation of predicted user needs and, specifically, prior to the predicted future occurrence of an offline viewing event. Algorithm 70 may be considered one possible implementation of predictive media file transfer algorithm 60, as generically illustrated in the upper portion of FIG. 1. Accordingly, and as previously noted, algorithm 70 may be carried-out by either media content server 12, by user-carried playback device 14, or by a combination thereof. In one non-limiting embodiment, processor 46 of user-carried playback device 14 carries-out algorithm 70 in accordance with software or an application executing on the Operating System (OS) of device 14.

After commencing algorithm 70, the executing device or devices (e.g., media content server 12 and/or user-carried playback device 14) monitor for the forecast occurrence of offline viewing events due to an anticipated end user desire to view media content in a future timeframe without reliance on a network connection. In embodiments, this may be accomplished by monitoring for information relating to the upcoming travel plans of an end user; e.g., by searching for information pertaining to or other indicia of impending user travel on a mass carrier, such as a commercial airliner. For example, during STEP 72 of algorithm 70, the executing device may extract outgoing flight information from a user's calendar and utilize this information to determine a departure time. In such embodiments, the executing device may be capable of accessing a user calendar or other information indicative of user travel plans (e.g., user text messages or emails) stored in memory 42, in the cloud, or otherwise accessible through network 16.

In certain cases, the executing device may extract information identifying the airliner (or other mass carrier) on which the user is booked to travel and then retrieve the departure time via a publicly-accessible website (e.g., a webpage of a commercial carrier, airport, or the like) listing such departure times. In other embodiments, the executing device may predict a user's upcoming travels and departure time based upon other information, such as information extracted from emails, text messages, or the like sent to or received by the user. In still further implementations, a user my simply enter information into the executing device specifying a departure time or from which a departure time can be derived; e.g., as indicated above, a user can indicate a flight number, and the executing device may then utilize this information to look-up the departure time of the specified flight number, as appropriate. While the present description principally focuses on airline travel, the executing device may also monitor for information pertaining to other types of user travel during STEP 72 and then conduct the remainder of algorithm 70, as discussed below. For example, in embodiments of algorithm 70, the executing device may also monitor for user travel to geographical regions in which the end user may desire to engage in offline viewing of media content; e.g., as when the user travels to a foreign country and/or travels to a relatively unpopulated region to, for example, camp.

At STEP 74 of algorithm 70, the executing device determines whether an offline viewing event is forecast to occur in a near future timeframe; e.g., within a specified number of days. If this is not the case, the executing device returns to STEP 72 and continues to monitor for the predicted occurrence of an offline viewing event. Alternatively, if an offline viewing event is forecast to occur within the future timeframe, the executing device next establishes media transfer start conditions for initiating transfer of selected media content ahead to the forecast occurrence of the media transfer event (STEP 76). Generally, establishing such media transfer start conditions may include setting a tentative schedule for conducting the media file transfer process. The tentative scheduled may take into account the cumulative amount of media content scheduled for transfer (that is, the total amount of data to transfer) and the approximate duration required for the transfer process to complete, as may be determined based upon estimated or current data transfer rates. Utilizing the estimated duration of the media file transfer process, a start time (or start window) for the media file transfer process may be established. The start time can be stored as a calendar date and time, which has a fixed or static value. Alternatively, a dynamic start time may be established, which may be adjusted on a repeated or iterative basis based upon such factors as variations in data transfer rates and changes in the parameters of the predicted offline viewing event, such as changes in travel (e.g., flight) departure times, as discussed below.

In certain embodiments, the executing device may establish the media file transfer start time based upon a predicted travel departure time and the duration of the transfer process. As a relatively simple example in the context of commercial flight, if a user's outgoing commercial airline flight was scheduled to depart at 6:00 PM, and the executing device estimates that the media content transfer or synchronization process would require 2 hours to complete, the executing device may initiate the media content transfer or synchronization process at or slightly before 4:00 PM. In more complex embodiments still pertaining to commercial airline flight, the executing device may further determine the airport from which the aircraft is scheduled to depart, estimate user travel time to the airport from which the aircraft is scheduled to depart, and define the media transfer start conditions based, at least in part, on the estimated travel time and the scheduled flight departure time; e.g., by utilizing such information to back-calculate the media transfer start time or window. As an example, the executing device may query a map application executed on playback device 14 or accessible via network 16 to estimate travel time to the point-of-departure, such as the appropriate airport, from the user's residence and then utilize this information accordingly. To continue the exemplary scenario introduced above in which departure of a user's flight was scheduled for a 6:00 PM departure time, if the executing device estimated travel time to require 1 hour and completion of the media content transfer or synchronization process to require 2 hours, the executing device may schedule the media content transfer process to initiate at 3:00 PM on the day of user travel.

Other factors may also be taken into account by the executing device when first establishing, or when subsequently refining (e.g., periodically updating), the media transfer start conditions. For example, in certain embodiments, the executing device may further estimate a user rest period during which the end user routinely sleeps; e.g., as determined based upon past user behavior and/or as assumed based upon time zone. The executing device may then schedule the media transfer start conditions to transfer at least a majority, if not the entirety of the selected media content to the user-carried memory component during the user rest period. In this manner, the executing device may simply initiate the media content transfer process one night prior to the user's estimated departure, possibly over a user's established sleep schedule, to allow the media content transfer or synchronization process to occur over the home network, while the user is asleep or otherwise unlikely to utilize user-carried playback device 14, as may be beneficial when playback device 14 serves as the executing device.

The type or source of the media content desirably transferred to the user-carried memory component (e.g., memory 42 and/or memory 64) may also be considered during the initial scheduling sub-process performed during STEP 76 of algorithm 70. For example, if video programming is scheduled for transfer from a home storage device (e.g., a user's home DVR) to the user-carried memory component, it may be desirable to conduct the media content transfer process while the memory component physically resides in the user's residence to allow the media content transfer process to occur over the user's home network. Selected media content or video programming transferred from a user's home DVR may be assigned a high transfer priority and initially copied to memory 42 of playback device 14 or memory 64 of storage device 62 during the media content transfer process. Conversely, in certain instances, program licenses may permit only a single copy of a video program to be stored on either a user's home DVR or memory 42 of playback device 14 at a given juncture in time. In such instances, it may be desirable to prevent premature transfer of the video programming to maximize the amount of time that such programming remains available on the user's home DVR (or other home storage device) for viewing. Accordingly, in other embodiments, playback device 14 may initiate transfer of such programming subject to single-copy license restrictions lastly during the below-described prioritization schedule.

Progressing to STEP 78 of algorithm 70, the executing device next determines whether the media file transfer conditions are desirably modified ahead of the transfer process. For example, in embodiments, a user may provide input modifying the start time (or start time window) of the scheduled media transfer process in certain cases. In this regard, after scheduling the media file transfer process at STEP 76, the executing device may generate a prompt or other visual notification of upcoming media file transfer process (e.g., on a display screen of user-carried playback device 14) to afford the user with an opportunity to modify the scheduled media file transfer process in some manner; e.g., by altering the start time, modifying the programming to be transferred, adjusting the order in which content is scheduled to be transferred, adjusting the file size and requested quality level of the programming scheduled for transfer, and so on. In still other embodiments, the executing device may automatically (that is, without requiring user input) adjust the file transfer start time in response to changes to the underlying trigger event. For example, in this latter regard, processor the executing device may retrieve online flight information (or other travel information) ahead of initiating the media file transfer process at STEP 82 (described below) to determine whether the user's outgoing flight (or other planned travel departure) has been cancelled or delayed. The executing device may then implement corresponding adjustments to the scheduled start time of the media file transfer process in response to any such changes in the flight departure time.

With continued reference to FIG. 2, the executing device next determines whether the scheduled media file transfer start conditions are satisfied such that media transfer should commence (STEP 80). In embodiments, this may involve simply determining whether the media file transfer start time (or window) has been reached. If the scheduled media file transfer start time has not been reached, the executing device returns to STEP 78 and continues to monitor for scheduled start time adjustments. If, instead, the media transfer conditions are satisfied the executing device advances to STEP 82 of algorithm 70 and carries-out the media file transfer process. In embodiments, the media transfer conditions may be satisfied when the current clock time reaches a predetermined media transfer start time. In other embodiments, a start window may be considered along with, for example, the availability or accessibility of a user's home network. In this case, the executing device may initially establish a start time window to initiate transfer of selected media content to the user-carried memory component. If a home network becomes accessible during the start time window, the executing device may then initiate transfer of the selected media content to the user-carried memory component when the home network becomes accessible. Conversely, if a home network is inaccessible during the start time window, initiating transfer of the selected media content to the user-carried memory component upon conclusion of the start time window.

In-situ user modifications to the media file transfer process may be permitted during STEP 82 of algorithm 70 in embodiments. So too may the potential viewing of transferred content on playback device 14 during the media file transfer process. Such process steps may be subject to user cancellation at any desired juncture during algorithm 70. As previously noted, the desired media content may be transferred utilizing any type of network protocols and applications, including TFTP and similar file transfer techniques. Additionally, in certain implementations, a layered encoding transfer approach may be employed during the media file transfer process. Further description of layered encoding transfer approaches can be found in the following U.S. patent, which is incorporated by reference: U.S. Pat. No. 9,705,727, entitled "REMOTE VIEWING OF MEDIA CONTENT UTILIZING LAYERED VIDEO ENCODING," and issued Jul. 11, 2017. The particular media content items to transfer to the user-carried memory component during STEP 82 can be determined by the executing device based upon user input, a pre-establisher user profile (e.g., as established by tracking user viewing behaviors or otherwise employing a learning model extracting information from available sources), the timeless of media content (e.g., more recent movies or sporting events may be preferentially transferred), the relatedness of the transferred media content to other content recently viewed or habitually viewed by the end user (e.g., recent episodes of a episodic series often viewed by the end user or sporting events featuring a user-followed sports team or athlete may be transferred), and so on. After transfer of all selected media content items to the user-carried memory component, or if a user should cancel or terminate algorithm 70 during STEP 82, the present iteration of algorithm 70 concludes.

There has thus been provided systems and methods for automatically transferring media content to a user-carried memory component in anticipation of predicted user needs or desires. Embodiments of the present disclosure forecast the future occurrence of an offline viewing event; e.g., by monitoring for information relating to the upcoming travel plans of an end user. More specifically, embodiments of the present may monitor for information pertaining to impending user travel on a mass carrier, such as a commercial airliner. For example, user communication logs, such as text messages or email communications for an end user account, may be searched for keywords or other indicators of airline flight reservations, such as confirmation emails received by the end user after reserving a seat on a commercial airline flight. Such travel departure information may then be utilized when initially establishing the media transfer start conditions and, specifically, the start time at which (or start time window within which) to initiate transfer of selected media files to the user-carried memory component. Other information can also be extracted from communications pertaining to commercial airline travel and then utilized to establish or modify the media transfer start time. In some implementations, the flight departure time may be repeatedly monitored for delays or any other changes and the media transfer start time may be modified accordingly. This, in turn, increases the likelihood that a user will be capable of engaging in offline viewing of media content, when desired, to enhance overall ease and convenience with the user consumes media content.

Embodiments of the above-described method can be conducted by a media content server and/or a playback device, which communicate over a network. In various embodiments, the method includes the step or process of determining when an offline viewing event is forecast to occur due to an anticipated desire on behalf of the end user to view media content in a future timeframe without reliance on a network connection. When determining that an offline viewing event is forecast to occur, media transfer start conditions are established for initiating transfer of selected media content to a user-carried memory component prior to the forecast offline viewing event. When the media transfer start conditions are satisfied, transfer of the selected media content is initiated from the media content server, over the network, and to the user-carried memory component. In certain embodiments, the step of determining may include utilizing user travel plan information extracted from a user calendar, as stored in a computer-readable medium, to forecast the occurrence of offline viewing events. In other embodiments, the step of determining may include searching a network-accessible communication log for airline flight confirmations; and, when locating an airline flight confirmation, utilizing the airline flight confirmation data to forecast the occurrence of an offline viewing event.

In still further embodiments in which determining comprises establishing a scheduled flight departure time of an aircraft on which the end user has reserved a seat, the method may include the steps of: (i) determining an airport from which the aircraft is scheduled to depart; (ii) estimating user travel time to the airport from which the aircraft is scheduled to depart; and (iii) defining the media transfer start conditions based, at least in part, on the estimated travel time and the scheduled flight departure time. Alternatively, the step of determining may entail establishing a scheduled flight departure time of an aircraft on which the end user has reserved a seat. In this latter case, the method may further include monitoring for changes to the scheduled flight departure time, and revising the media transfer start conditions in response to any changes in the scheduled flight departure time.

In yet other implementations, establishing media transfer start conditions may include estimating a user rest period during which the end user routinely sleeps, and then scheduling the media transfer start conditions to transfer at least a majority of the selected media content to the user-carried memory component during the user rest period. Alternatively, establishing media transfer start conditions may include: (i) establishing a start time window to initiate transfer of selected media content to the user-carried memory component; (ii) if a home network becomes accessible during the start time window, initiating transfer of the selected media content to the user-carried memory component when the home network becomes accessible; and (iii) if a home network is inaccessible during the start time window, initiating transfer of the selected media content to the user-carried memory component upon conclusion of the start time window.

Finally, in further embodiments, the method may include the addition steps or processes of establishing a priority order for transfer of the selected media content to the user-carried memory component based, at least in part, on whether any media content scheduled for transfer is protected by a single copy license; and carrying-out transfer of the selected media content to the user-carried memory component in accordance with the established priority order. In such embodiments, or in the other embodiments mentioned in the preceding paragraphs, the media content server may assume the form of a home media device (e.g., an STB or DVR) located in a residence of the end user, and the home media device may perform the above-described steps of determining and establishing. Additionally or alternatively, the user-carried memory component may be located or contained within a user-carried playback device (e.g., a smartphone, tablet, laptop, or wearable device) in embodiments, and the user-carried playback device performs the steps of determining and establishing.

The term "exemplary" is used herein to represent one example, instance or illustration that may have any number of alternates. Any implementation described herein as "exemplary" should not necessarily be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents. Finally, numerical identifiers, such as "first" and "second," have been utilized in the foregoing Detailed Description to reflect an order of introduction of similar elements or features in at least some instances. Such numerical identifiers may also be utilized in the subsequent Claims to reflect the order of introduction therein. As the order of introduction of such elements or features may vary between the Detailed Description and the Claims, the usage of such numerical identifiers may also vary accordingly.

What is claimed is:

1. A method carried-out utilizing a media content server, a network, and a user-carried memory component carried by an end user and accessible to the media content server over the network, the method comprising:
  determining when an offline viewing event is forecast to occur due to an anticipated desire on behalf of the end user to view media content in a future timeframe without reliance on a network connection;
  when determining that an offline viewing event is forecast to occur, setting a tentative schedule for conducting a media file transfer process, the tentative scheduled taking into account a cumulative amount of media content scheduled for transfer and an approximate duration required for the transfer process to complete wherein the approximate duration is estimated based upon data transfer rates;
  utilizing the approximate duration which has been estimated for the media file transfer process to establish media transfer start conditions for initiating transfer of selected media content to the user-carried memory component prior to the forecast offline viewing event;
  adjusting on an iterative basis based upon variations in estimated data transfer rates and changes in a set of parameters associated with the forecast offline viewing event, the media transfer start conditions to initiate transfer for the selected media content; and
  upon satisfaction of the media transfer start conditions, initiating transfer of the selected media content from the media content server, over the network, and to the user-carried memory component.

2. The method of claim 1 wherein determining comprises utilizing user travel plan information extracted from a user calendar, as stored in a computer-readable medium, to forecast the occurrence of offline viewing events.

3. The method of claim 1 wherein determining comprises:
  searching a network-accessible communication log for airline flight confirmations; and
  when locating an airline flight confirmation, utilizing the airline flight confirmation data to forecast the occurrence of an offline viewing event.

4. The method of claim 1 wherein determining comprises establishing a scheduled flight departure time of an aircraft on which the end user has reserved a seat, and wherein the method further comprises:
  determining an airport from which the aircraft is scheduled to depart;
  estimating user travel time to the airport from which the aircraft is scheduled to depart; and
  defining the media transfer start conditions based, at least in part, on the estimated travel time and the scheduled flight departure time.

5. The method of claim 1, wherein determining comprises:
  establishing a scheduled flight departure time of an aircraft on which the end user has reserved a seat, and wherein the method further comprises:

monitoring for changes to the scheduled flight departure time; and
revising the media transfer start conditions in response to any changes in the scheduled flight departure time.

6. The method of claim 1 wherein determining comprises establishing a scheduled flight departure time of an aircraft on which the end user has reserved a seat, and wherein the method further comprises:
monitoring for changes to the scheduled flight departure time; and
revising the media transfer start conditions in response to any changes in the scheduled flight departure time.

7. The method of claim 1 wherein establishing media transfer start conditions comprises:
estimating a user rest period during which the end user routinely sleeps; and
scheduling the media transfer start conditions to transfer at least a majority of the selected media content to the user-carried memory component during the user rest period.

8. The method of claim 1 wherein establishing media transfer start conditions comprises:
establishing a start time window to initiate transfer of selected media content to the user-carried memory component;
if a home network becomes accessible during the start time window, initiating transfer of the selected media content to the user-carried memory component when the home network becomes accessible; and
if a home network is inaccessible during the start time window, initiating transfer of the selected media content to the user-carried memory component upon conclusion of the start time window.

9. The method of claim 1 further comprising:
establishing a priority order for transfer of the selected media content to the user-carried memory component based, at least in part, on whether any media content scheduled for transfer is protected by a single copy license; and
carrying-out transfer of the selected media content to the user-carried memory component in accordance with the established priority order.

10. The method of claim 1 wherein the media content server comprises a home media device located in a residence of the end user, and wherein the home media device performs the steps of determining and establishing.

11. The method of claim 1 wherein user-carried memory component is located in a user-carried playback device, and wherein the user-carried playback device performs the steps of determining and establishing.

12. A user-carried playback device utilized in conjunction with a media content server, the user-carried playback device comprising:
a memory component;
a processor coupled to the memory component; and
computer-readable code that, when executed by the processor, causes the user-carried playback device to perform the operations of:
determining when an offline viewing event is forecast to occur due to an anticipated desire on behalf of the end user to view media content in a future timeframe without reliance on a network connection;
when determining that an offline viewing event is forecast to occur, setting a tentative schedule for conducting transfer of selected media content by taking into account a cumulative amount of media content that is scheduled for transfer and an approximate duration for completion of transferring the cumulative amount of media content scheduled in order to establish media transfer start conditions for initiating transfer of selected media content to the memory component contained in the user-carried playback device prior to the forecast occurrence of the offline viewing event wherein the approximate duration for the completion of the transferring of the cumulative amount of the media is based on current data transfer rates; and
when the media transfer start conditions are satisfied, initiating transfer of the selected media content from the media content server, over a network, and to the user-carried memory component.

13. The user-carried playback device of claim 12 wherein the computer-readable code, when executed by the processor, causes the user-carried playback device to utilize user travel plan information extracted from a user calendar when determining whether an offline viewing event is forecast to occur.

14. The user-carried playback device of claim 12 wherein the computer-readable code, when executed by the processor, causes the user-carried playback device to:
search a network-accessible communication log for airline flight confirmations; and
when locating an airline flight confirmation, utilizing the airline flight confirmation data when determining whether an offline viewing event is forecast to occur.

15. The user-carried playback device of claim 12 wherein the computer-readable code, when executed by the processor, causes the user-carried playback device to:
establish a scheduled flight departure time of an aircraft on which the end user has reserved a seat;
identify an airport from which the aircraft is scheduled to depart;
estimate user travel time to the airport from which the aircraft is scheduled to depart; and
define the media transfer start conditions based, at least in part, on the estimated travel time and the scheduled flight departure time.

16. The user-carried playback device of claim 12 wherein the computer-readable code, when executed by the processor, causes the user-carried playback device to:
establish a scheduled flight departure time of an aircraft on which the end user has reserved a seat, and wherein the method further comprises:
monitor for changes to the scheduled flight departure time; and
revise the media transfer start conditions in response to any changes in the scheduled flight departure time.

17. The user-carried playback device of claim 12 wherein the computer-readable code, when executed by the processor, causes the user-carried playback device to:
estimate a user rest period during which the end user routinely sleeps; and
schedule the media transfer start conditions to transfer at least a majority of the selected media content to the user-carried memory component during the user rest period.

18. The user-carried playback device of claim 12 wherein the computer-readable code, when executed by the processor, causes the user-carried playback device to:
establish a start time window to initiate transfer of selected media content to the user-carried memory component;
if a home network becomes accessible during the start time window, initiate transfer of the selected media content to the user-carried memory component when the home network becomes accessible; and if a home network is inaccessible during the start time window, initiate transfer of the selected media content to the user-carried memory component upon conclusion of the start time window.

19. The user-carried playback device of claim 12 wherein the computer-readable code, when executed by the processor, causes the user-carried playback device to:

establish a priority order for transfer of the selected media content to the user-carried memory component based, at least in part, on whether any media content scheduled for transfer is protected by a single copy license; and carry-out transfer of the selected media content to the user-carried memory component in accordance with the established priority order.

20. A media content server utilized in conjunction with a user-carried memory component carried by an end user, the media content server comprising:

a processor; and a computer-readable storage medium storing a computer-readable code that, when executed by the processor, causes the media content server to perform the operations of:

determining when an offline viewing event is forecast to occur due to an anticipated desire on behalf of the end user to view media content in a future timeframe without reliance on a network connection;

when determining that an offline viewing event is forecast to occur, setting a tentative schedule for conducting a media file transfer process, the tentative schedule based in part on a cumulative amount of media content scheduled for transfer and an estimation of an approximate duration for completion of the cumulative amount of media content that is scheduled for transfer;

establishing media transfer start conditions based in part on the estimation of completion by the approximate duration of the cumulative amount of media content for initiating transfer of selected media content to the memory component contained in the user-carried playback device prior to the forecast occurrence of the offline viewing event; and when the media transfer start conditions are satisfied, initiating transfer of the selected media content from the media content server, over a network, and to the user-carried memory component.

* * * * *